(12) United States Patent
Matsumoto et al.

(10) Patent No.: US 9,255,608 B2
(45) Date of Patent: Feb. 9, 2016

(54) LINEAR GUIDE APPARATUS

(71) Applicant: NSK Ltd., Shinagawa-ku, Tokyo (JP)

(72) Inventors: Jun Matsumoto, Kanagawa (JP);
Yoshinori Mizumura, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/396,860

(22) PCT Filed: Apr. 22, 2013

(86) PCT No.: PCT/JP2013/002701
§ 371 (c)(1),
(2) Date: Oct. 24, 2014

(87) PCT Pub. No.: WO2013/161260
PCT Pub. Date: Oct. 31, 2013

(65) Prior Publication Data
US 2015/0110426 A1    Apr. 23, 2015

(30) Foreign Application Priority Data

Apr. 27, 2012  (JP) ................. 2012-103270

(51) Int. Cl.
*F16C 29/04* (2006.01)
*F16C 33/66* (2006.01)
(Continued)

(52) U.S. Cl.
CPC ............... *F16C 33/76* (2013.01); *F16C 29/06* (2013.01); *F16C 29/065* (2013.01); *F16C 29/086* (2013.01); *F16C 29/088* (2013.01); *F16C 2322/39* (2013.01)

(58) Field of Classification Search
CPC ...... F16C 29/06; F16C 29/065; F16C 29/084; F16C 29/086; F16C 33/76; F16C 33/7823; F16C 29/0673
USPC .......... 384/7, 13, 15, 43–45, 50, 42; 277/345, 277/412, 559
See application file for complete search history.

(56) References Cited

U.S. PATENT DOCUMENTS 5,087,130 A * 2/1992 Tsukada .................. 384/15
5,388,911 A * 2/1995 Agari ...................... 384/15
(Continued)

FOREIGN PATENT DOCUMENTS

JP        4-136317 U     12/1992
JP        2006-64007 A    3/2006
(Continued)

OTHER PUBLICATIONS

International Search Report dated Jul. 30, 2013 with English translation (Two (2) pages).
(Continued)

*Primary Examiner* — Marcus Charles
(74) *Attorney, Agent, or Firm* — Crowell & Moring LLP (57) ABSTRACT

A linear guide apparatus is provided such that even if the length of an underseal is changed, the adhesion of the underlip and the side lip can be maintained and the lubricant leakage from the slider is preventable. In the linear guide apparatus, the underseal (10) includes a gap seal protrusion part (20) formed to protrude toward a side seal (17) side to seal the gap between the underseal and the side seal. The gap seal protrusion part (20) is integrally formed adjacently to an underlip (10*b*) of the underseal (10), and is in contact with a terminal end face (17*e*) of the side lip (17*b*) of the side seal (17) without a gap.

1 Claim, 12 Drawing Sheets

(51) Int. Cl.
*F16C 33/76* (2006.01)
*F16C 29/06* (2006.01)
*F16C 29/08* (2006.01)

(56) References Cited

U.S. PATENT DOCUMENTS

| | | | |
|---|---|---|---|
| 5,388,912 A * | 2/1995 | Agari | 384/15 |
| 5,492,412 A * | 2/1996 | Tsukada | 384/15 |
| 5,678,829 A * | 10/1997 | Kalsi et al. | 277/559 |
| 5,873,576 A * | 2/1999 | Dietle et al. | 277/559 |
| 7,387,441 B2 * | 6/2008 | Ubukata et al. | 384/13 |
| 7,950,852 B2 * | 5/2011 | Kondo | 384/15 |
| 7,993,059 B2 * | 8/2011 | Lin et al. | 384/15 |
| 2006/0214380 A1* | 9/2006 | Dietle et al. | 277/559 |
| 2008/0144980 A1* | 6/2008 | Keller et al. | 384/15 |
| 2009/0052815 A1* | 2/2009 | Kakei | 384/7 |
| 2010/0329595 A1 | 12/2010 | Kuwabara et al. | |

FOREIGN PATENT DOCUMENTS

| | | | |
|---|---|---|---|
| JP | 2008-69872 A | | 3/2008 |
| JP | 2008057690 A | * | 3/2008 |
| JP | 2008144875 A | * | 6/2008 |
| JP | 2011-12715 A | | 1/2011 |
| JP | 2012154431 A | * | 8/2012 |

OTHER PUBLICATIONS

Japanese-language Written Opinion (PCT/ISA/237) dated Jul. 30, 2013 (Three (3) pages).
International Preliminary Report on Patentability (PCT/IB/338 & PCT/IB/373) dated Nov. 6, 2014, including English translation of Document C2 (Japanese-language Written Opinion (PCT/ISA/237)) previously filed on Oct. 24, 2014 (six (6) pages.
Chinese language Office Action dated Jun. 3, 2015 with English translation (Seven (7) pages).

* cited by examiner

LINEAR GUIDE APPARATUS

CROSS-REFERENCE TO RELATED APPLICATIONS

This application is a National Stage of PCT/JP2013/002701, filed Apr. 22, 2013, which claims priority under 35 U.S.C. §119 to Japanese Application No. JP2012-103270 filed Apr. 27, 2012.

TECHNICAL FIELD

The present disclosure relates to a linear guide apparatus for use in a machine tool or the like as a means of guiding a linearly moving object in the moving direction, the linear guide apparatus being provided with a guide rail and a slider slidably straddling over the guide rail via rolling elements.

BACKGROUND ART

In the above-described linear guide apparatus (i.e., a linear guide), side seals and underseals are used as seal members of a slidingly contact part of the guide rail and the slider. That is, the linear guide apparatus is configured such that a lubricant is sealed in the slider to maintain its capabilities for a long term. For this reason, once the lubricant leaks outside the slider, contamination occurs at its periphery. Besides, if there is a large amount of lubricant leakage, the lubricant in the slider is short and the function of the linear guide apparatus cannot be maintained.

Thus, for example, in PLT 1, side seals are provided to the slider to prevent the leakage of the lubricant from the slider. The side seals are respectively attached on end faces in the linearly moving direction of the slider (hereinafter, the direction in which the slider linearly moves along the guide rail), to prevent the lubricant in the slider from leaking to the outside in the axial direction of the guide rail. Hence, as to the linearly moving direction of the linear guide apparatus, the side seals disclosed in PTL 1 are capable of preventing the leakage of the lubricant.

As to the leakage of the lubricant from the bottom face of the slider, however, underseals have to be provided additionally. In PLT 2, the underseals are provided to the slider. The underseal is attached at a part where there is a gap generated between the slider and the guide rail below the sleeve part of the straddling slider, so as to prevent the lubricant in the slider from leaking from the bottom face side of the linear guide apparatus.

In such a situation, when the side seals and the underseals are respectively configured as separate parts, the production is made easy. In this case, in order to prevent the lubricant leakage, hopefully, the side seals and the underseals are adhered to each other without a gap. Thus, for example, in PTL 3, an assistance lip is provided on the rear face of the side seal to fill in a step. Accordingly, the assistance lip of the side seal and an end face of the underseal are adhered at a predefined position, so that the side seal and the underseal are adhered to each other without a gap.

CITATION LIST

Patent Literature

PTL 1: JP 2008-69872 A
PTL 2: JP 2006-64007 A
PTL 3: JP 2011-12715 A

SUMMARY OF INVENTION

Technical Problem

In the technique disclosed in PTL 3, however, it is necessary to manage the length of the underseal strictly to adhere the assistance lip of the side seal and the end face of the underseal at a predefined position.

Figure 18:
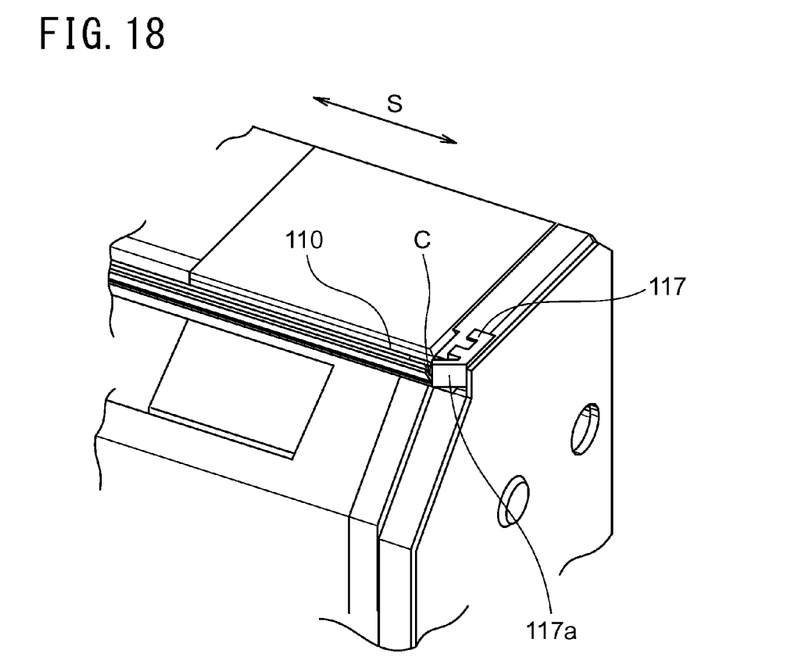
FIG. 18 is a substantial part perspective view of a slider in one technology, when viewed from the sleeve part bottom face of side.

In other words, as illustrated in FIG. 18, which is illustrative of a perspective view of substantial parts of a slider in one technology, when viewed from the bottom face side, when an underseal 110 is even slightly shorter in a linearly moving direction S, seal member end faces of a side seal 117 and an underseal 110 cannot be adhered to each other at a predefined position. Therefore, a gap C is generated between a seal portion 117a of the side seal 117 and an end face of the underseal 110, as illustrated in FIG. 18. On the contrary, when the underseal 110 is long, the end face of the underseal 110 exceeds the seal portion 117a of the side seal 117 at a predefined position and then pushes to bend the seal portion 117a. Accordingly, the side seal 117 deforms, and the adhesion degree of the guide rail, not illustrated, and the side seal 117 degrades. Therefore, since a gap is generated between the side seal 117 and the guide rail, the lubricant might be leaked out of the slider. Besides, when the length of the underseal 110 is tried to be managed strictly, there is a problem that the labor and cost are needed.

Therefore, the present disclosure has been made in view of the above circumstances, and has an object to provide a linear guide apparatus in which side seals and an underseal are used as seal members of a slidingly contact part of the guide rail and the slider. Even if the length of the underseal changes, the adhesion of an underlip and a side lip can be maintained and the lubricant leakage from the slider can be prevented.

Solution to Problem

In order to solve the above problem, according to an aspect of the present invention, there is provided a linear guide apparatus, comprising: a guide rail; and a slider straddling over the guide rail, wherein: the slider slidingly moves in a linearly moving direction over the guide rail via rolling elements in left and right sleeve parts of the slider, aside seal and an underseal are provided to be different parts, as seal members of a sliding contact part of the guide rail and the slider, the side seal including a side lip extending along an outer circumference of the guide rail to seal an end face in the linearly moving direction of the slider, the underseal including an under lip extending in the linearly moving direction of the slider to seal a part where a gap is generated between a lower part of a sleeve part of the slider and the guide rail, the underseal includes a gap seal protrusion part formed in at least an end part in the linearly moving direction or a vicinity of the end part to protrude toward the side seal side to seal a gap between the underseal and the side seal, and the gap seal protrusion part is integrally formed adjacently to the underlip of the underseal, and is in contact with a terminal end face of the side lip of the side seal without a gap.

Herein, in the linear guide apparatus, in one embodiment, the side seal includes a soft material part and a hard material part, and the end part in the linearly moving direction or the vicinity of the end part where the gap seal protrusion part is formed, in the underseal, is interposed between the soft material part and the hard material part of the side seal.

Advantageous Effects of Invention

According to the present disclosure, the gap seal protrusion part is provided in at least an end part in the linearly moving direction or a vicinity of the end part to seal the gap between the underseal and the side seal. Thus, the provision of the gap seal protrusion part prevents the lubricant leakage from the vicinity of the end part in the linearly moving direction between the side lip and the underlip. With such a configuration, the side seals and the underseals are provided as different parts. Hence, even if the length of the underseals changes, the adherence of the underseals and the side lips can be maintained, thereby preventing the leakage of the lubricant.

DESCRIPTION OF EMBODIMENTS

Some embodiments of the present disclosure will be described with reference to the accompanied drawings appropriately.

Figure 1:
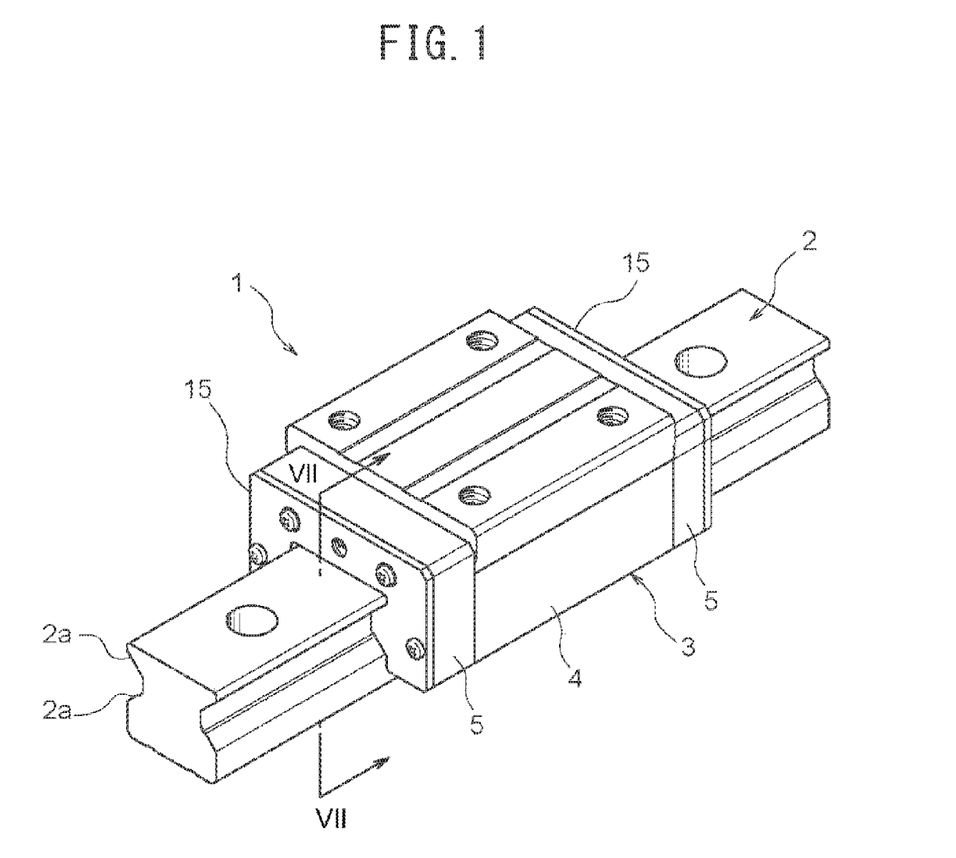
FIG. 1 is a perspective view illustrative of a linear guide apparatus, in one embodiment of the present disclosure.
Figure 2:
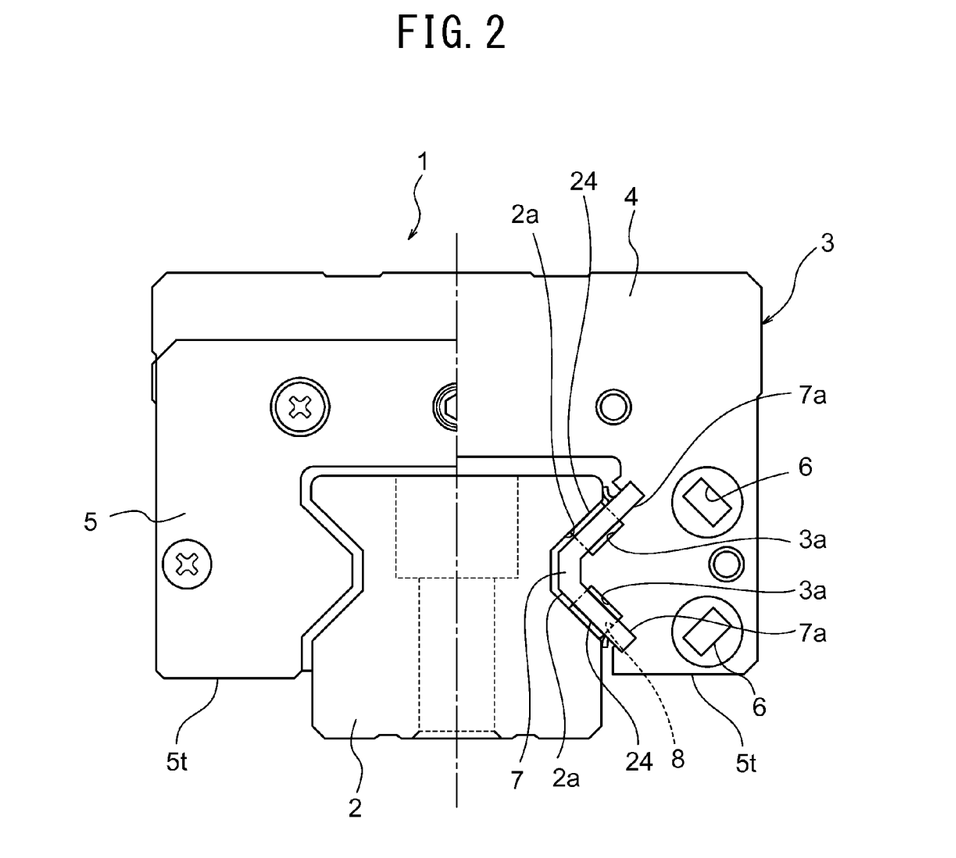
FIG. 2 is a front view of FIG. 1, in which a right side part from the center is cut away.

Referring to FIG. 1 and FIG. 2, a linear guide apparatus 1 includes a guide rail 2 and a slider 3 slidably straddling over the guide rail via rolling elements (i.e., cylindrical rollers in this example) 24.

Specifically, as illustrated in FIG. 2, the guide rail 2 is configured such that rolling element raceway faces 2a each having a planar shape are formed on left and right side faces in a longitudinal direction of the guide rail 2. In this example, two rolling element raceway faces 2a are formed on each of the left and right side faces of the guide rail 2. In addition, the slider 3 is configured such that rolling element raceway faces 3a each having a planar shape are formed on a left side internal face and a right side internal face of a slider body 4 to face the rolling element raceway faces 2a, respectively, and rolling element rolling passages each having a linear shape are formed between the rolling element raceway faces 2a and 3a of the guide rail 2 and the slider 3.

Then, a number of rolling elements 24 rolling in accordance with the movement in the linearly moving direction of the slider 3 or the guide rail 2 are disposed in the rolling element rolling passage. These rolling elements 24 are each formed in the shape of a cylindrical roller. After having rolled through the rolling element rolling passage, the rolling elements 24 change the direction in end caps 5 (see FIG. 1) arranged on both ends in the forward and backward direction of the slider 3, and the rolling elements 24 come back to the original position via a rolling element return passage 6 (see FIG. 2) formed in the slider 3 to enable endless circulation. In this way, the slider 3 is configured to move slidably over the guide rail 2 through the rolling elements 24 in the sleeve parts on the left and right side of the slider 3 smoothly in the linearly moving direction.

Retainers 7 for the rolling elements 24 are provided on left and right side internal faces of the slider 3, as illustrated in FIG. 2. The retainer 7 has two plate-shaped parts 7a facing the rolling element raceway faces 2a of the guide rail 2, respectively, as illustrated in FIG. 3 and FIG. 4, and the rolling elements 24 rolling over the rolling element raceway faces 3a of the slider 3 are retained in rolling element retaining windows 8 each having a rectangular shape, respectively, formed in the plate-shaped parts 7a of the retainer 7.

Figure 3:
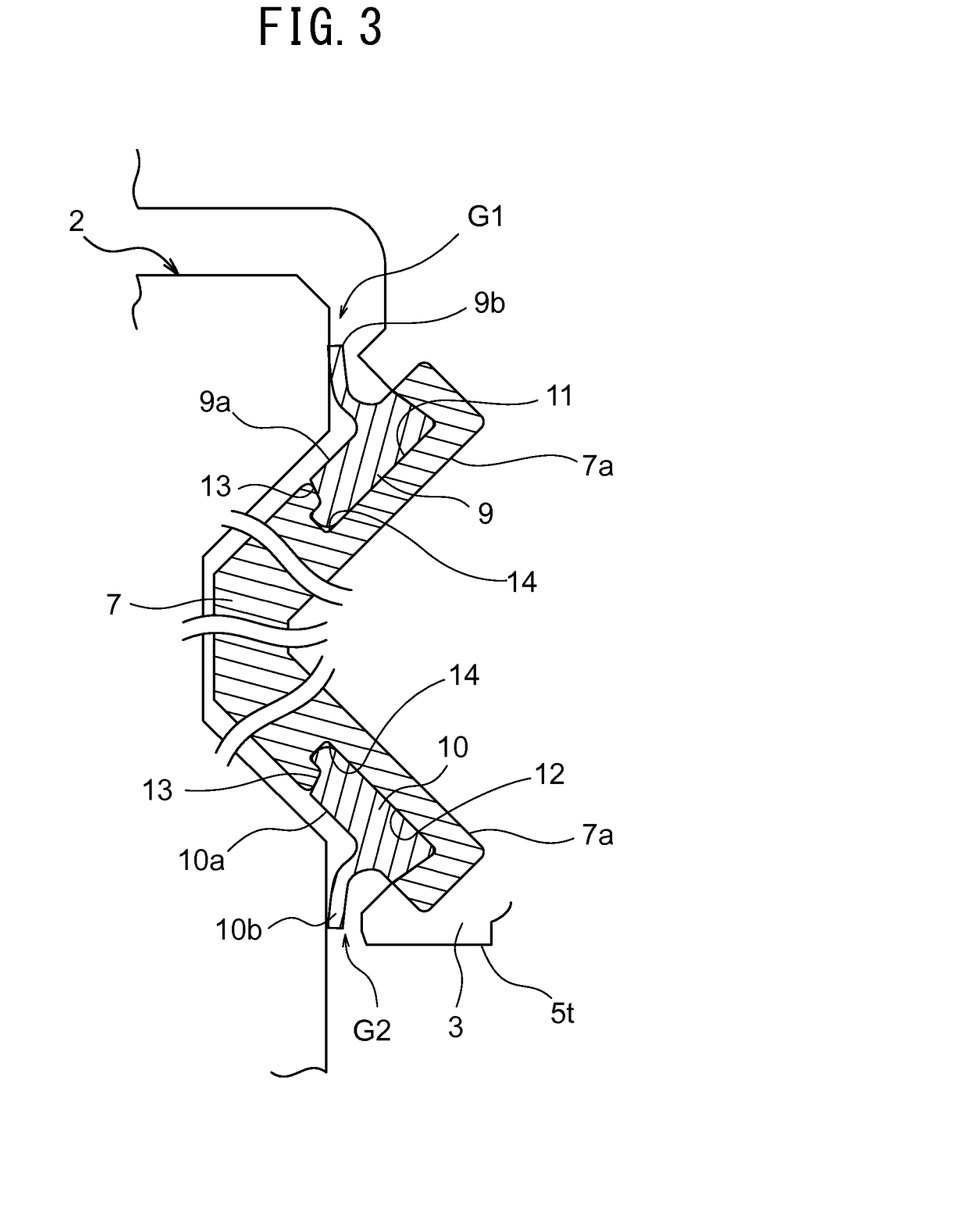
FIG. 3 is an enlarge view of substantial parts in FIG. 2.
Figure 4:
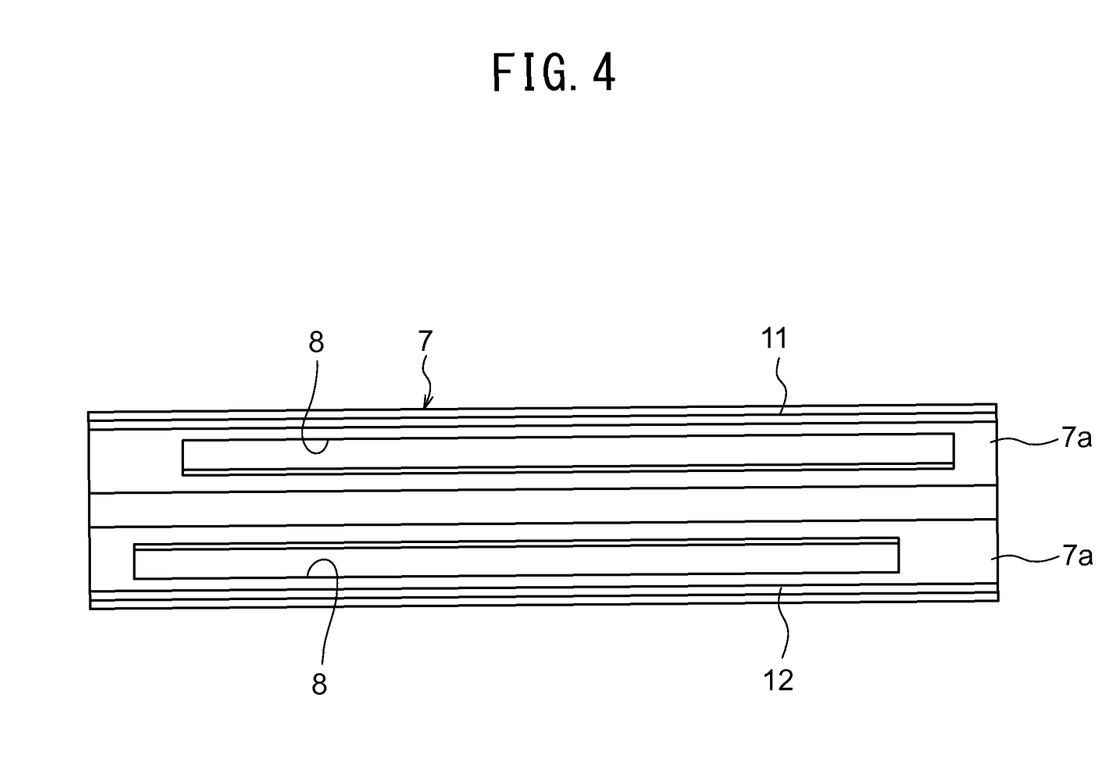
FIG. 4 is a view of a retainer of FIG. 2, when viewed from a side face.

Referring now to FIG. 3, between left and right side internal faces of the guide rail 2 and the internal faces of the left and right sleeve parts of the slider 3, an upper seal 9 and an underseal 10 are provided as seal members in almost the full length of the slider 3 in the linearly moving direction. The seal member 9 or 10 is, for example, an injection molded article of a soft synthetic resin (i.e., an elastic material such as polyester-based elastomer, urethane-based elastomer, or the like), or an integral molded article of a soft material (i.e., rubber, elastomer, or the like) with base parts 9a and 10a of metal plates (i.e., a steel material or an aluminum material).

In other words, as illustrated in FIG. 3, the seal members 9 and 10 has the base parts 9a and 10a, respectively. The retainer 7 is formed with seal member attaching grooves 11 and 12 each having a dovetail groove shape for engagement with the base parts 9a and 10a of the seal members 9 and 10, respectively. The seal member attaching grooves 11 and 12 are formed in the retainer 7 in almost the full length of the slider 3, and in the seal member attaching grooves 11 and 12, protrusion strip parts 14 serving as stoppers for engagement with depressed strip parts 13 provided in the base parts 9a and 10a of the seal members 9 and 10, in almost the full length of the slider 3, respectively.

Also, as illustrated in FIG. 3, the seal members 9 and 10 have elastic lips 9b and 10b, respectively, in contact with a side face of the guide rail 2. A gap G1 between a side face upper part of the guide rail 2 and an internal face upper part of the slider 3 are sealed by the elastic lip 9b of the upper seal 9, whereas a gap G2 between a lower part of the side face of the guide rail 2 and a lower part of the internal face of the slider 3 are sealed by the elastic lip (i.e., underlip) 10b of the underseal 10.

In such a configuration, when the elastic lips 9b and 10b of the seal members 9 and 10 abut with the side face of the guide rail 2 in an oblique direction, as illustrated in FIG. 3, the elastic lips 9b and 10b of the seal members 9 and 10 elastically deform in an arc shape, and in this state, come into contact with the side face of the guide rail 2. In this way, the contact pressure against the guide rail 2 is relaxed, and the contact pressures or the contact areas of the elastic lips 9b and 10b against the guide rail 2 can be suppressed from changing greatly depending on the attached positions of the seal members 9 and 10. Thus, an increase in the frictional force is kept small, and the gaps between the side face of the guide rail 2 and the internal face of the slider 3 can be sealed satisfactorily. It is to be noted that the underseal 10 will be described later in more detail.

Figure 5:
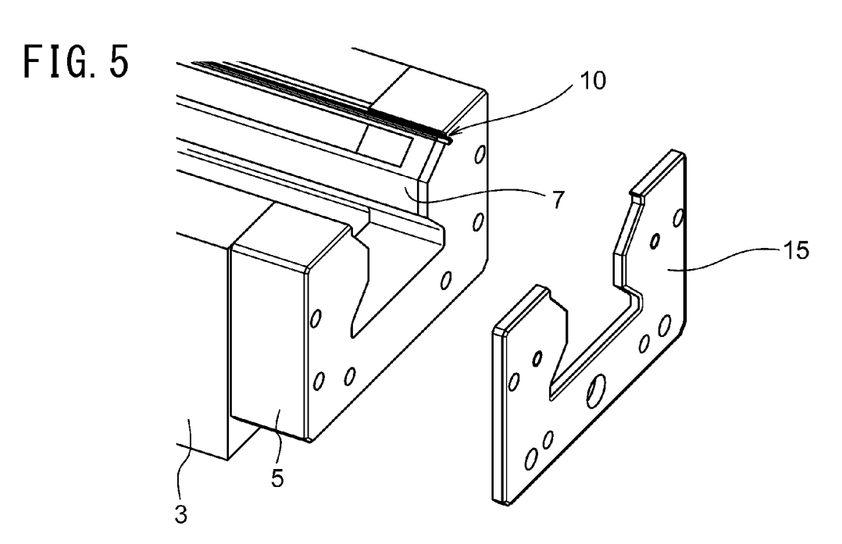
FIG. 5 is an exploded perspective view illustrative of a state where bottom faces of sleeve parts of the slider face upwardly, and a side seal plate is removed.

Moreover, as illustrated in FIG. 1, the gap generated between the guide rail 2 and each of the end caps 5 is sealed by a side seal plate 15 (see FIG. 5) attached on the front face of each of the end caps 5.

Figure 6:
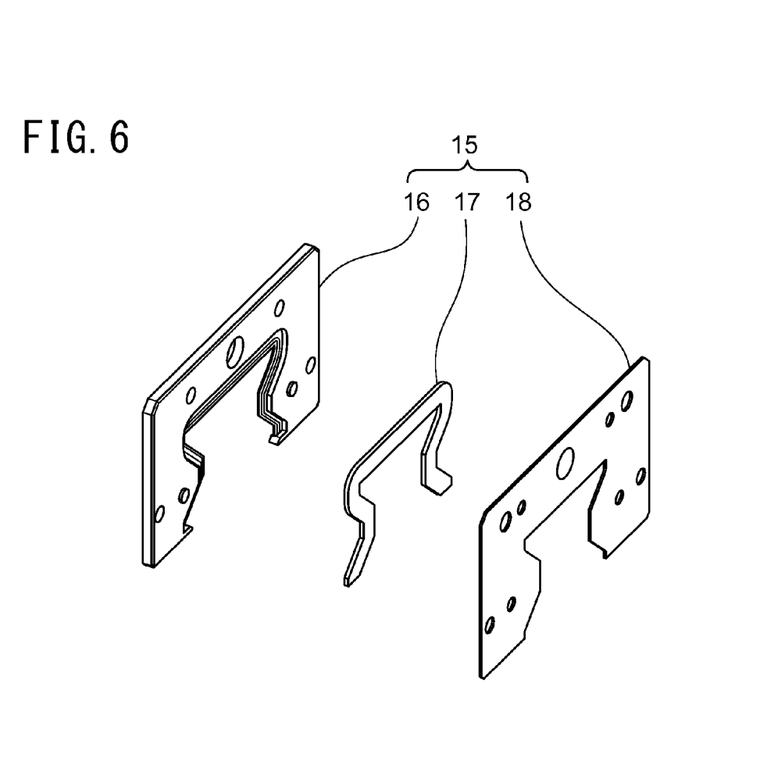
FIG. 6 is an exploded perspective view of the side seal plate (with the posture of FIG. 1)

Specifically, as illustrated in an exploded perspective view of FIG. 6, the side seal plate 15 includes a holder plate 16 and a seal member (i.e., a side seal) 17, and a cover 18. The cover 18 is a press formed article of a metal plate (i.e., a steel material, an aluminum material, or the like). The holder plate 16 is an injection molded article of a synthetic resin (i.e., polyacetal, polyamide, or the like), which is a hard material. The seal member 17 is an injection molded article of a synthetic resin (i.e., polyester-based elastomer, urethane-based elastomer, or the like) or a rubber (i.e., nitrile rubber, fluorine-containing rubber, or the like), which is a soft material. It is to be noted that specific brand names of polyester-based elastomer are Pelprene (registered trademark) EN1000, EN2000, EN3000, and EN5000 of Toyobo Co., Ltd. Alternatively, Hytrel (registered trademark) of Toray Du Pont Co., Ltd can be mentioned.

Figure 7:
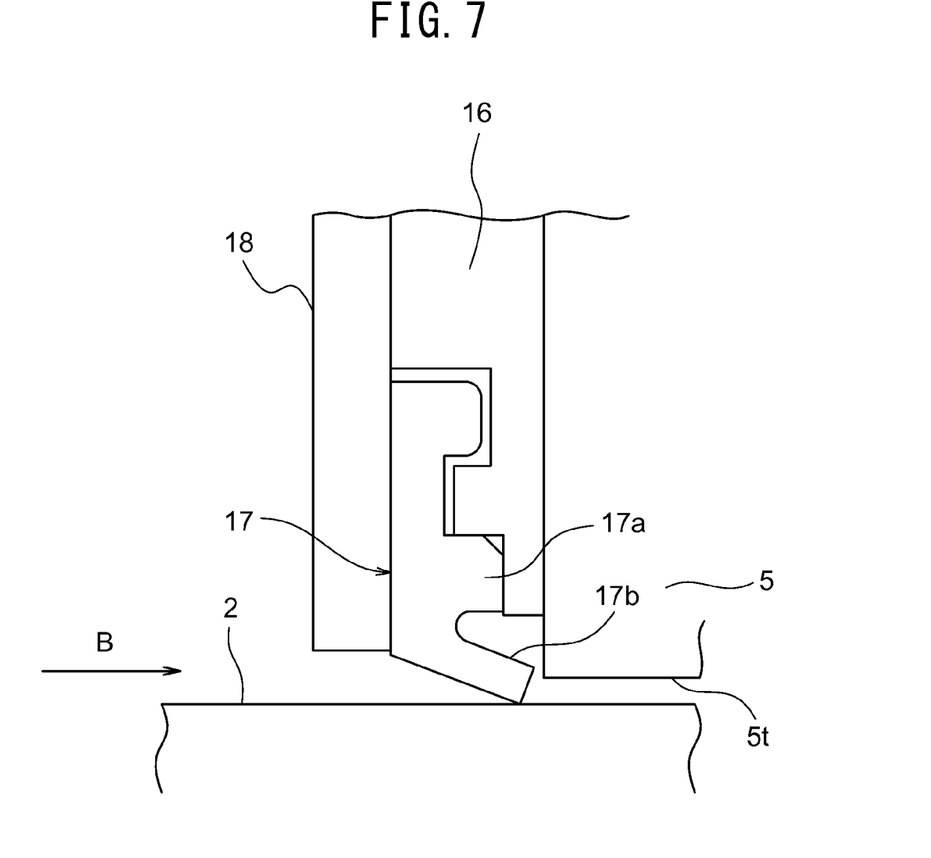
FIG. 7 is a cross-sectional view (taken along line VII-VII of FIG. 1) of the side seal plate in a linearly moving direction.

Here, the seal member (i.e., side seal) 17 of the side seal plate 15 is provided as a different part which is not restricted from the underseal 10. The seal member (i.e., side seal) 17 of the side seal plate 15, as illustrated in FIG. 7 (i.e., a cross-sectional view taken along line VII-VII in FIG. 1), is configured such that the side lip 17b protruding from the base part 17a of the seal member is provided at a slant in a direction toward the slider body 4 side to contact the outer circumferential surface (i.e., surface) of the guide rail 2. Accordingly, the side lip 17b of the seal member (i.e., side seal) 17 slidingly contacts the outer circumferential surface of the guide rail 2 so as to prevent the leakage of the lubricant. Since the side lip 17b is slanted toward the slider body 4 side, the tip of the side lip 17b comes into contact with the guide rail 2 at an edge part of the slider side. Thus, the effect of preventing the lubricant leakage is sufficient.

Figure 8A:
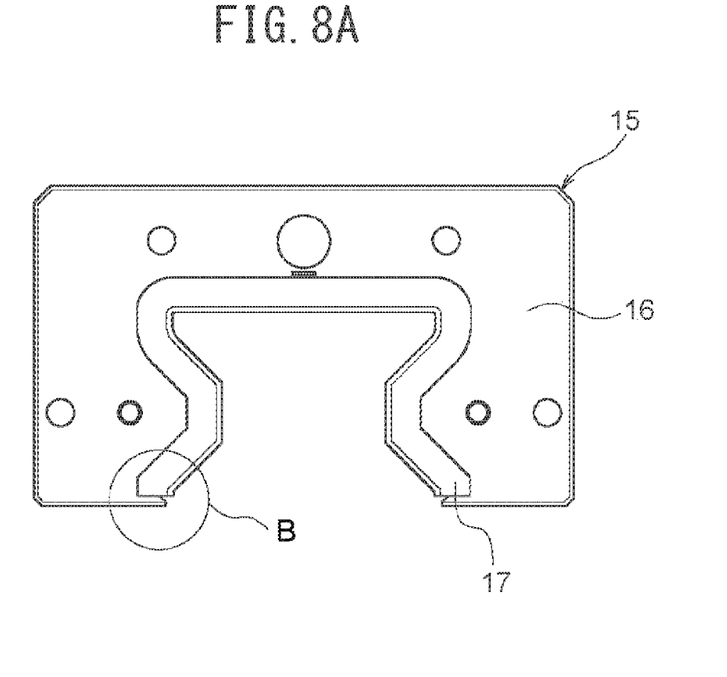
FIG. 8A is a front view of a state where a holder plate 16 of the side seal plate 15 and a seal member 17 are assembled together.
Figure 8B:
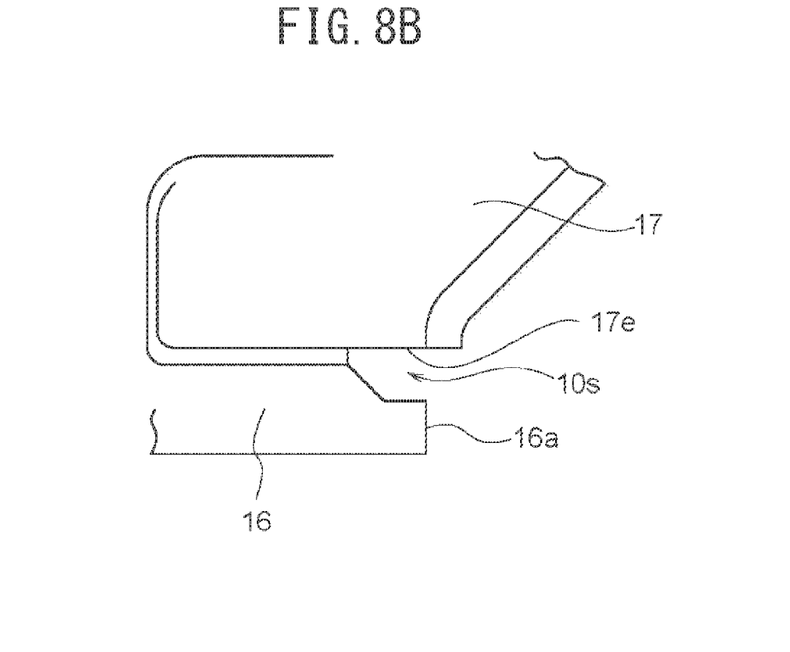
FIG. 8B is a detailed view of a substantial part (i.e., part B) of FIG. 8A.

FIG. 8A is a front view of a state where the holder plate 16 that is a hard material part of the side seal plate 15 and the seal member 17 that is a soft material part are assembled together, and FIG. 8B is a detailed view of substantial parts (i.e., part B) of FIG. 8A.

Figure 9:
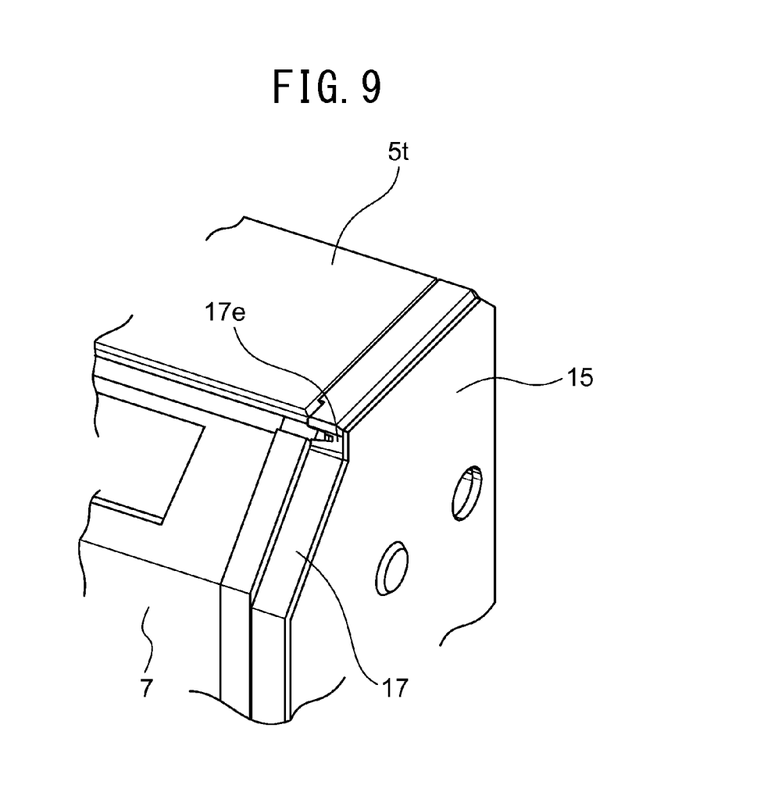
FIG. 9 is an enlarge view of substantial parts in a state where an underseal is not attached to the slider (with the bottom faces facing upwardly), but the side seal plate is attached.

As illustrated in FIG. 8A and FIG. 8B, a protrusion part 16a is formed on a lower end of the holder plate 16 that is a hard material part. An insertion slit 10s of the underseal 10 is defined by the protrusion part 16a and a terminal end face 17e of the seal member 17. Accordingly, as illustrated in a substantial part perspective view of FIG. 9, in this state, the terminal end face 17e of the seal member 17 is exposed to a bottom face 5t side of the end cap 5.

Figure 10:
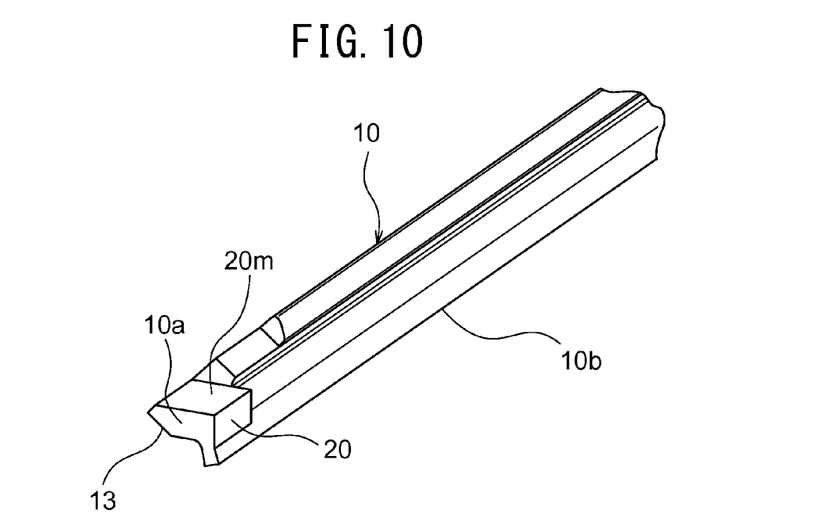
FIG. 10 illustrates a perspective view (including an end part and its vicinity) of the underseal.

FIG. 10 illustrates a perspective view (including an end part and its vicinity) of the underseal 10. In the underseal 10, gap seal protrusion parts 20 are formed to be continuous with the elastic lip (i.e., underlip) 10b of the underseal 10 on both end parts in a longitudinal direction of the underseal 10. The longitudinal length of the gap seal protrusion part 20 is almost the same with or slightly shorter than the thickness of the seal member 17.

Figure 11:
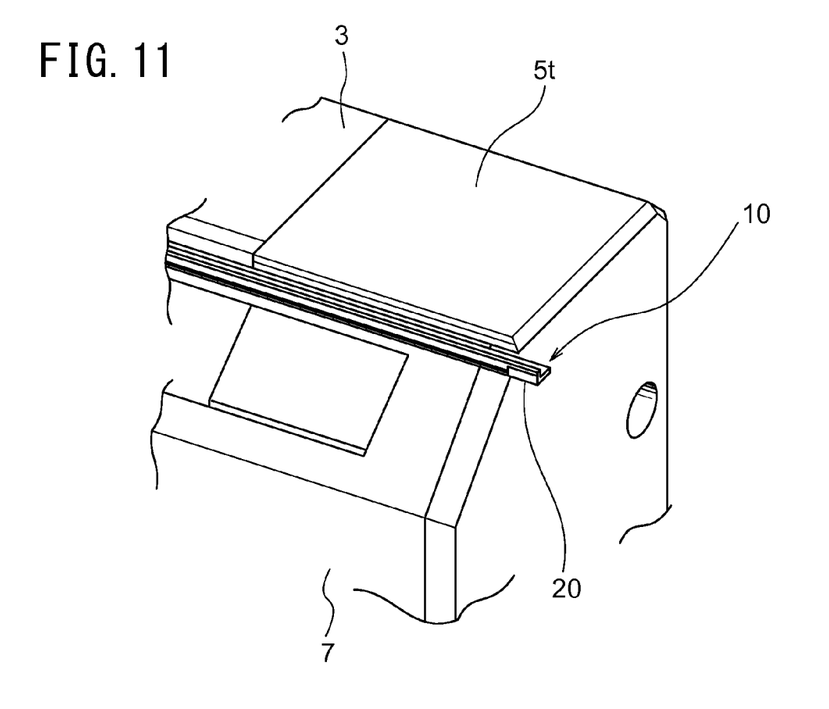
FIG. 11 is a perspective view of substantial parts in a state where the underseal is attached to the slider (with the bottom faces of the sleeve parts facing upwardly), but the side seal plate is not attached.

FIG. 11 illustrates a perspective view of substantial parts in a state where the underseal 10 is attached, but the side seal plate 15 is not attached. As illustrated in FIG. 11, in this state, the end part of the underseal 10 projects from the end face of the end cap 5 in the longitudinal direction (i.e., linearly moving direction).

Figure 12:
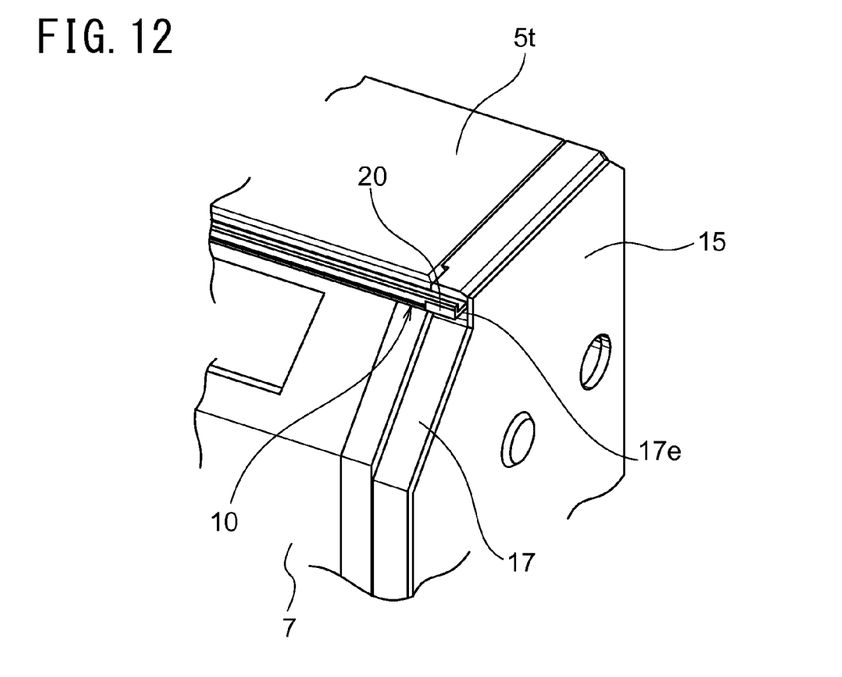
FIG. 12 is a perspective view of substantial parts in a state where the underseal is attached to the slider (with the sleeve part bottom faces of the s facing upwardly), and the side seal plate is also attached.
Figure 13:
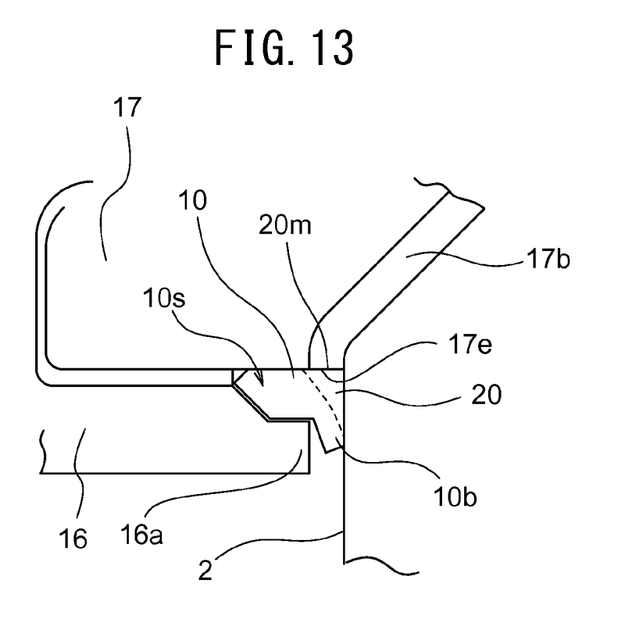
FIG. 13 is a substantial part enlarged view (corresponding to FIG. 8B), when viewed from arrow B of FIG. 7.

FIG. 12 illustrates a perspective view of substantial parts in a state where the underseal 10 is attached to the slider 3, and the side seal plate 15 is also attached. As illustrated in FIG. 12 and FIG. 13, a longitudinal end part of the underseal 10 is inserted into the insertion slit 10s of the underseal 10. Then, the vertical position of the end part of the underseal 10 is determined between the protrusion part 16a of the holder plate 16 and the terminal end face 17e of the seal member 17. Therefore, the end parts of the underseal 10 do not deflect vertically, and it is possible to prevent the generation of a gap between the underseal 10 and the seal member 17 of the side seal plate 15.

Next, operation and working effects of above-described linear guide apparatus 1 will be described.

As illustrated in FIG. 13, the linear guide apparatus 1 is configured such that the underseal 10 has the gap seal protrusion part 20 formed at the end part in the linearly moving direction to protrude on the side seal 17 side to seal a gap between the underseal 10 and the side seal 17, and the gap seal protrusion part 20 is integrally formed adjacently to the underlip 10b of the underseal 10 and is in contact with the terminal end face 17e of the side lip 17b of the side seal 17 without a gap. Therefore, the provision of the gap seal protrusion part 20 prevents leakage of the lubricant from the vicinity of the end part in the linearly moving direction between the side lip 17b and the underlip 10b.

In some embodiments, the holder plate 16 is molded with a hard synthetic resin, and the bottom face of the underseal 10 faces the holder plate 16, and is supported by the holder plate 16. Accordingly, there is a sufficient effect of preventing a deflection of the underseal 10, since the holder plate hardly deforms as compared to a case where the holder plate is made of a soft material. It is to be noted that a top face 20m (i.e., opposite side face to the surface facing of the holder plate 16) of the gap seal protrusion part 20 out of the end parts of the underseal 10 faces the seal member 17 of a soft material.

Therefore, it is suitable to elastically deform the seal member 17 and adhere the underseal 10, in one embodiment.

In such an adhesion state in some embodiments, the terminal end face 17e of the seal member 17 of the side seal plate 15 and the opposing face 20m of the gap seal protrusion part 20 formed at the end part projecting in the linearly moving direction of the underseal 10 abut each other. The above abutment enables the gap seal protrusion part 20 to seal the gap between the underseal 10 and the seal member 17 of the side seal plate 15. Thus, the lubricant does not leak out of the gap.

Figure 14:
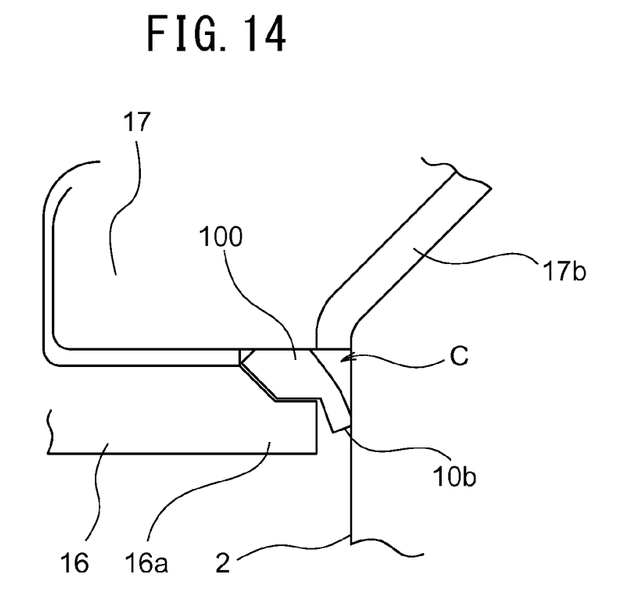
FIG. 14 is a comparative example illustrative of an effect of the present disclosure, and is a view corresponding to FIG. 13.

In contrast, FIG. 14 illustrates a comparative example to describe an effect of the gap seal protrusion part 20 in some embodiments. When the gap seal protrusion part 20 is not provided, the gap C illustrated in FIG. 14 is generated between the seal member 17 of the side seal plate 15 and the underseal 10. Therefore, the lubricant leaks out of the gap C.

In addition, in some embodiments, as described above, the underseal 10 and the seal member 17 are included as different parts which are not restricted from each other in the longitudinal direction (i.e., linearly moving direction) of the guide rail 2. Thus, even if the length of the underseal 10 changes to some extent in the linearly moving direction, by a production error or swelling in use (i.e., the size increased by the lubricant), the contact state of the underseal 10 and the seal member 17 does not change. Therefore, a desired seal state is maintainable. Accordingly, the strict management of the length of the underseal 10 is not demanded and the labor and cost are eliminated.

Further, in some embodiments, since the gap seal protrusion part 20 is provided only on both end parts in the longitudinal direction (see FIG. 10), it is possible to reduce the contact part with the guide rail 2, as compared to the case where the gap seal protrusion part 20 is provided in almost the full length. Thus, it is possible to reduce the frictional resistance by the contact, and the sliding operation of the slider does not become heavy.

It is to be noted that the linear guide apparatus according to the present disclosure is not limited to the above-described embodiments. Various modifications are possible as far as the embodiments do not deviate from the purpose of the present disclosure.

For example, in the above-described embodiments, an example has been described such that the end parts of the underseal 10 are vertically positioned between the protrusion part 16a of the holder plate 16 and the terminal end face 17e of the seal member 17. The present disclosure, however, is not limited to the above-described embodiments. If the configuration of the underseal 10 is stable and retainable, the protrusion part 16a of the holder plate 16 is not necessarily provided, as illustrated as a modification to the above-described embodiments in FIG. 15.

Figure 15:
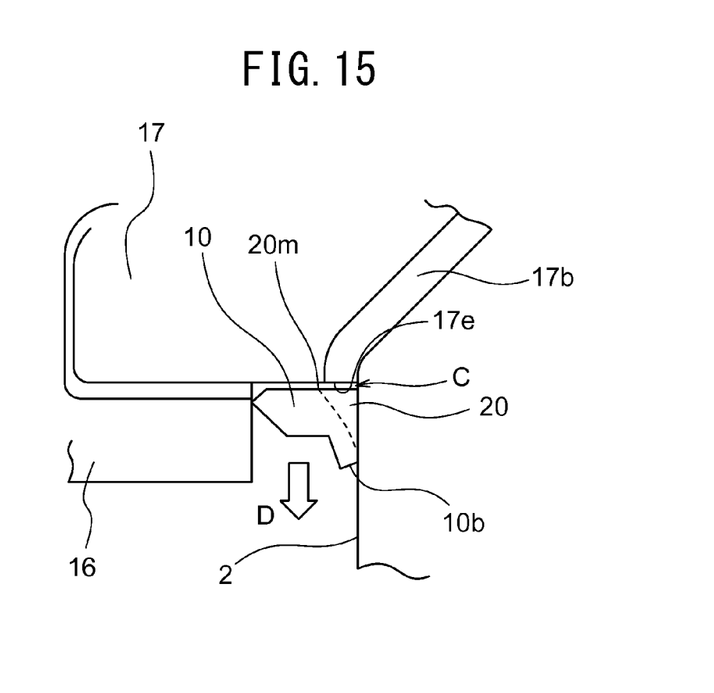
FIG. 15 is a view illustrative of a first modification of the present disclosure, and is a view corresponding to FIG. 13.

That is to say, if the configuration of the underseal 10 is unstable and the protrusion part 16a of the holder plate 16 is not provided, as illustrated in FIG. 15, the end part of the underseal 10 escapes from the slider 3 downwardly due to an occurrence of a production error or deflection in use (as indicated by reference D) of the underseal 10. Then, since the gap C is generated between the underseal 10 and the seal member 17 of the side seal plate 15, the lubricant might leak from the gap C. The deflection D is easy to occur, in particular, when the underseal 10 is an injection molded article of a synthetic resin. On the other hand, when the underseal 10 is obtained by integrally molding a resin (or a rubber) with a metal plate as a base part, such a deflection D hardly occurs. Therefore, in this case, the protrusion part 16a of the holder plate 16 is not necessarily formed.

Also, in the above-described embodiments, an example has been described such that each side seal plate 15 is arranged to each end cap 5. The present disclosure, however, is not limited to the above-described embodiments. For example, as illustrated in modifications of FIG. 16 and FIG. 17, plural side seal plates may be provided for each end cap 5. For example, in the example illustrated in FIG. 16 and FIG. 17, two side seal plates are provided for each end cap 5.

Figure 16:
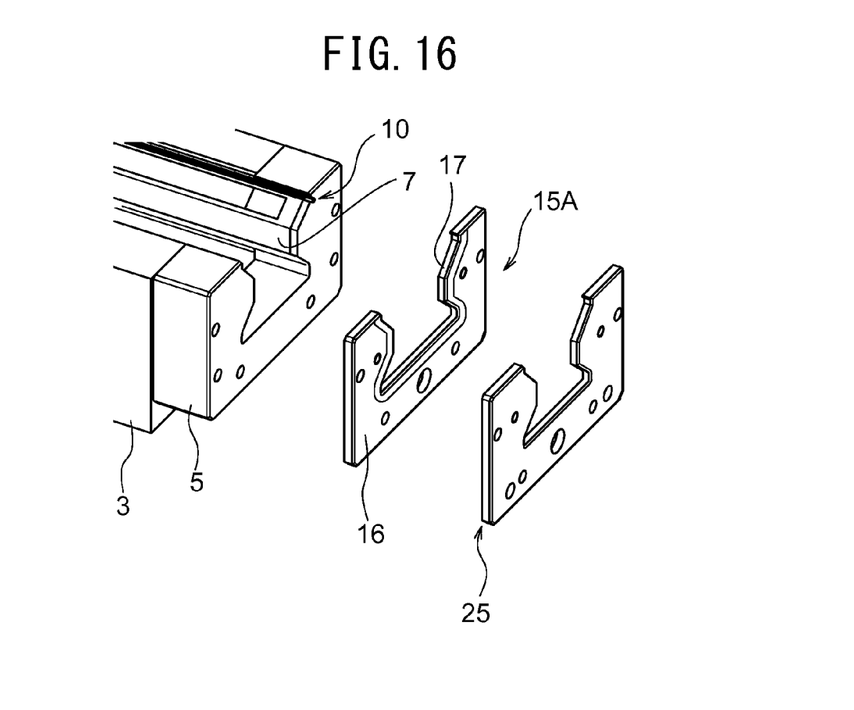
FIG. 16 is a perspective view illustrative of a second modification of the present disclosure (and is a view corresponding to FIG. 5)
Figure 17:
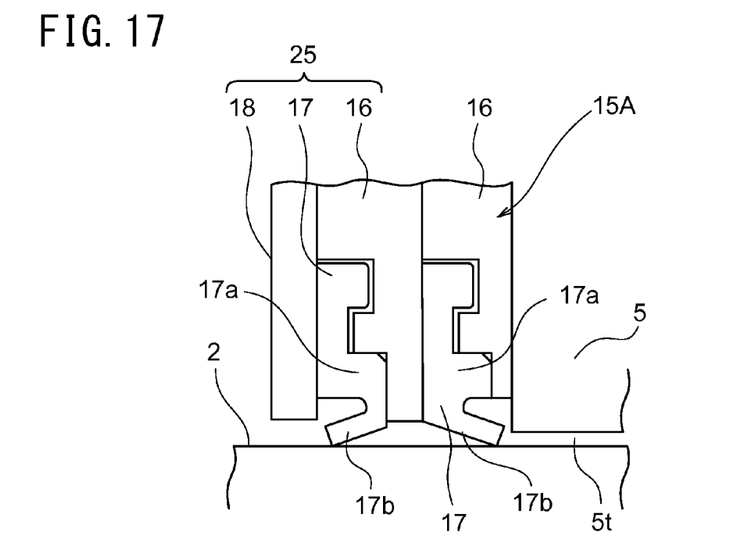
FIG. 17 is a cross-sectional view of the side seal plate in the linearly moving direction in the second modification of the present disclosure (and is a view corresponding to FIG. 7)

Specifically, in this example, a first side seal (i.e., a part corresponding to the above-mentioned side seal plate 15) 15A and a second side seal 25 are fastened together and secured with a screw (not illustrated) in this order from each end cap 5 side. The first side seal 15A includes the holder plate 16 and the seal member 17, and the second side seal 25 is attached, instead of a cover. Therefore, the cover 18 is not provided. The second side seal 25 includes the holder plate 16, the seal member 17, and the cover 18, as similarly illustrated in FIG. 6.

Moreover, FIG. 17 illustrates an enlarged cross-sectional view of a side seal plate in the linearly moving direction. The seal members 17 of the side seals 15A and 25 have the side lips 17b extending along the outer circumference of the guide rail 2, respectively. Here, the side lip 17b of the first side seal 15A extends at a slant toward the end cap 5 side from a main body 17a of the seal member 17. On the other hand, as to the seal member 17 of the second side seal 25, the side lip 17b extends at a slant to an opposite side to the end cap 5 from the main body 17a of the seal member 17.

In other words, the side lip 17b of the second side seal 25 comes into contact with the guide rail 2 at an edge part on the opposite side to the end cap 5. Accordingly, with a configuration in a modification, there are provided both of the second side seal 25 having a high effect of preventing entrance of a foreign material and the first side seal 15A having an effect of preventing the lubricant leakage. As compared with the configuration in the above-mentioned embodiments, there is a sufficient effect of preventing the entrance of a foreign material and the lubricant hardly leaks out of the slider 3. Therefore, a long term use is suitable.

REFERENCE SIGNS LIST 1 linear guide apparatus
2 guide rail
3 slider
4 slider body
5 end cap
7 retainer
8 rolling element retaining window
9 upper seal
10 underseal
10b elastic lip (underlip)
13 depressed strip part
14 protrusion strip part
15 side seal plate
16 holder plate
17 seal member (side seal)
17a base part of seal member
17b side lip
17e terminal end face
18 cover
20 gap seal protrusion part
24 rolling element

The invention claimed is:

1. A linear guide apparatus, comprising:
a guide rail; and
a slider straddling over the guide rail, wherein:

the slider slidingly moves in a linearly moving direction over the guide rail via rolling elements in left and right sleeve parts of the slider, a side seal and an underseal are provided to be different parts, as seal members of a sliding contact part of the guide rail and the slider, the side seal including a side lip extending along an outer circumference of the guide rail to seal an end face in the linearly moving direction of the slider, the underseal including an under lip extending in the linearly moving direction of the slider to seal a part where a gap is generated between a lower part of a sleeve part of the slider and the guide rail, the underseal includes a gap seal protrusion part formed in at least an end part in the linearly moving direction or a vicinity of the end part to protrude toward the side seal side to seal a gap between the underseal and the side seal, and the gap seal protrusion part is integrally formed adjacently to the underlip of the underseal, and is in contact with a terminal end face of the side lip of the side seal without a gap, wherein the side seal includes a soft material part and a hard material part, and the end part in the linearly moving direction or the vicinity of the end part where the gap seal protrusion part is formed, in the underseal, is interposed between the soft material part and the hard material part of the side seal.

* * * * *